United States Patent Office 3,127,674
Patented Apr. 7, 1964

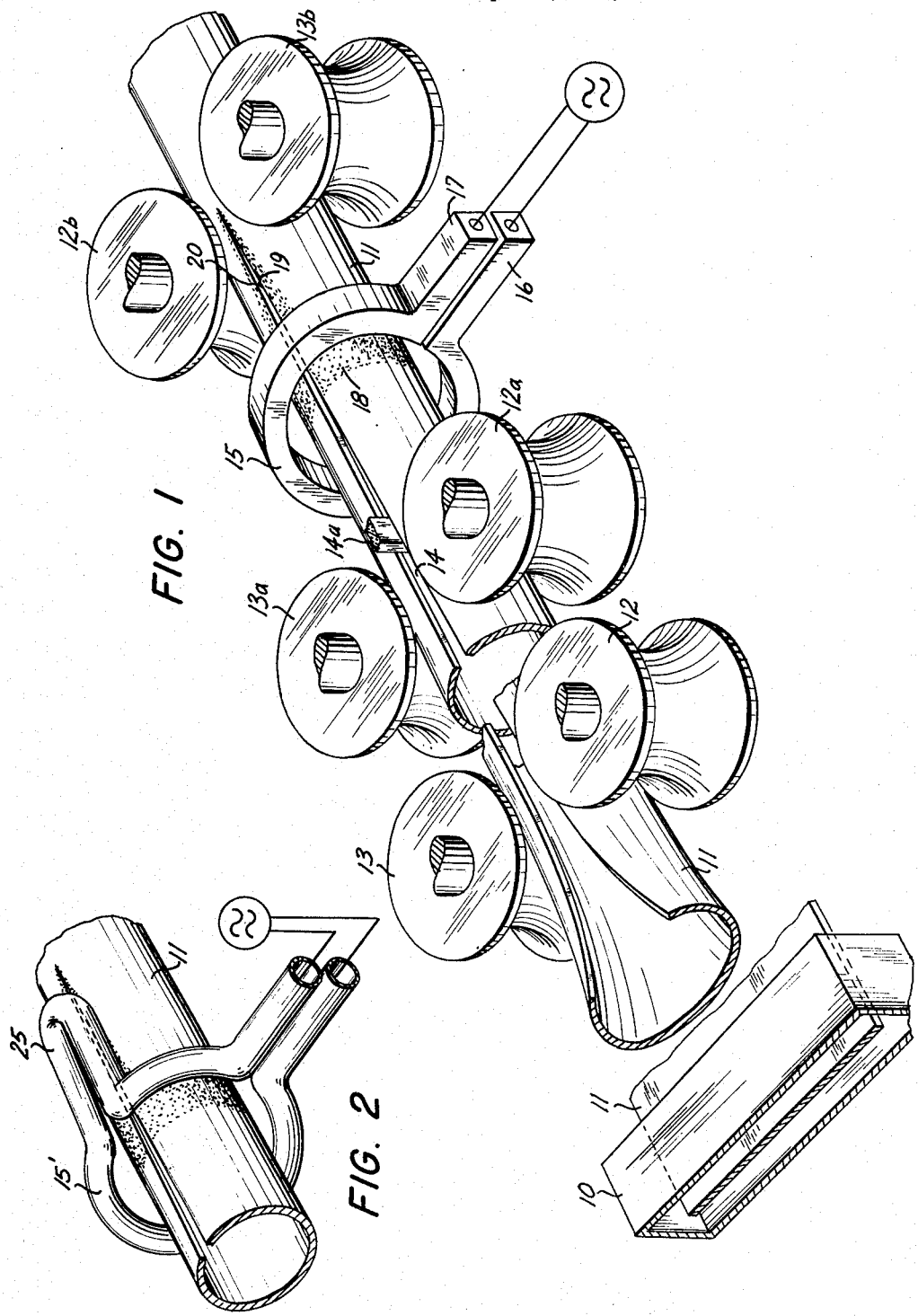

3,127,674
WELDING OF FERROUS TUBING
Fred Kohler, New York, N.Y., assignor to American Machine & Foundry Company, New York, N.Y., a corporation of New Jersey
Filed Sept. 6, 1962, Ser. No. 221,740
2 Claims. (Cl. 29—477.7)

This invention relates to the welding of tubing and the like and more particularly to the welding of a longitudinal seam along tubing formed of ferrous metals.

This application comprises a continuation-in-part of application Serial No. 43,640, filed July 18, 1960, and now abandoned.

In numerous tube mills in various countries, one method of welding a longitudinal seam in ferrous metal tubing has been to heat a ferrous metal strip such as of iron, steel or alloy steel, by passing same through a furnace wherein the temperature of the strip is raised to the neighborhood of 2200° F. The strip is then passed between forming rolls for shaping same to tubular form and then between squeeze rolls wherein the meeting edges of the strip as formed into tubing are welded together. Just prior to the point of welding, the temperature of the meeting strip edges is raised to welding temperature by blowing oxygen or air against such edges, thereby further to heat same by oxidation fully to the desired welding temperature at the point where the squeeze rolls press the edges into welded relation. This method, however, has a number of shortcomings. Since the strip has to be heated to a very high temperature in the furnace, considerable expenses are involved in proper maintenance of the furnace and also there are substantial losses of metal due to the formation of scale on same because of the high furnace temperature. Furthermore, because of the step of finally heating the edges to welding temperature by oxidation, the resulting oxidized surfaces as brought together and welded do not permit of a high quality weld because of the necessary presence with this method of oxide on the edges as they are squeezed together at the weld point.

Another well known method for welding ferrous metal tubing is to advance the metal strip through a tube mill for shaping the strip into tubing with a gap in advance of the weld point, while the edges at such gap are heated by the use of an induction coil of one or more turns carrying high frequency current and usually surrounding the tubing in advance of the weld point. This method also has shortcomings in that large amounts of power are required to heat the metal all the way up to welding temperature and the necessarily heavy high frequency current required to accomplish all of such heating involves substantial expense. And if the induction heating coil used surrounds the tubing, it will cause the entire cross-sectional mass of the tubing to become heated with consequent serious and expensive power losses, and even though an effort is made to so shape and position the heating coil means as to avoid, as far as possible, heating of the back portions of the tubing, there will still be a serious waste of power in heating portions of the tube metal spaced considerably from the desired weld line.

The present invention has, as general objects, the provision of a method which is effective for minimizing the difficulties of the methods above referred to and for producing a weld of improved quality.

In accordance with the present method, the metal strip is first heated by passing the same through a furnace, but instead of heating same to a temperature close to welding temperature, it is heated only to a temperature preferably some hundreds of degrees below 2200° F. but at least substantially to or somewhat above the Curie point for the iron or steel of which the strip is formed. Such Curie point varies slightly for different steels, but in the typical case may be about 1330° F. With the heating temperature in the furnace limited to such a value, the furnace maintenance problems are much less troublesome than when temperatures up to around 2200° F. are used, and furthermore, the formation of scale on the metal strip is greatly minimized. As the strip is advanced from the furnace, it is then passed through forming rolls for shaping it to approximately tubular form with a longitudinal gap therein. Thence it is passed through the nip of a pair of squeeze rolls for bringing the edges together for welding. Shortly prior to the latter rolls, a high frequency induction heating coil is suitably mounted to heat the approaching gap edges and so as finally to heat same to welding temperature at the point where same come into contact and become welded together. Now, inasmuch as the tubing as it arrives within the induction heating coil has been heated to its Curie point, the tube metal is no longer magnetic. It will be understood that when the metal is at a temperature exceeding the Curie point, its consequent loss of magnetic properties permits the currents generated therein by induction to penetrate much more deeply into the metal and be distributed in the metal with substantially less effective resistance, with the consequent diminution of the heating effect, except where concentration of the current is actually desired and occurs, due to the configuration of the metal, at the edges of the V-shaped gap just in advance of the weld point. Thus with the invention, the greater part of the required heating of the tubing may be accomplished economically in a furnace of moderate temperature and the final heating may be accomplished by the induction heating step much more economically than was heretofore possible with induction heating of ferrous tubing, because most of the heating has previously been accomplished and also because there is little waste of heat around the back side of the tubing or at any places other than at the edges to be welded. Also, since the final heating to welding temperature does not need to be accomplished by an oxidation process but is quickly and intensively accomplished by electrical resistance heating, the gap edges where squeezed together at the weld point may be kept substantially free of scale or oxide and therefore a weld of high quality is obtainable. In this connection, it will be appreciated by those persons skilled in the art that since only the edges of the tubing are heated to welding temperature and at the weld point, the remainder of the tubing remains relatively stiff thereby permitting a greater squeeze pressure to be applied, and thus also contributing to the superior quality of the resulting weld.

Various further and more specific objects, features and advantages of the invention will appear from the description given below, taken in connection with the accompanying drawings, illustrating somewhat schematically by way of example preferred arrangements for carrying out the invention.

FIG. 1 is a perspective view somewhat schematically illustrating one embodiment of the invention; and FIG. 2 is a view illustrating an alternative form of induction heating coil which may be used.

Here, as indicated at 10, a furnace of known type such as above referred to, is provided and through which in known manner the strip 11, which is to be formed into tubing, may be continuously passed and heated preferably up to a temperature substantially equal to or somewhat above the Curie point of the iron, steel or steel alloy of the strip. In typical cases, this temperature, as above indicated, may be in the neighborhood of 1330° F. But if desired, it is not essential that the strip be heated up to exactly its Curie point or higher. Instead it may be heated to a temperature sufficiently near the Curie point so that in the susequent induction heating step, the Curie point is reached almost immediately. In other cases, the ferrous strip may be heated up to a temperature for example in the neighborhood of 1800° F. This may be particularly desirable in cases where a tube is to be formed of a size in excess of the desired final diameter, so that it has to be stretched to reduce its diameter to that desired as it passes along through the mill. In such cases the heating of the entire strip which is to form the tubing to a temperature of about 1800° F. is desirable inasmuch as such stretching would be difficult to accomplish with tubing at lower temperatures. But in any event, the ferrous strip in passing through and from the furnace is only heated to a temperature which will be very substantially below the desired welding temperature and preferably low enough so that troublesome scale formation thereon will be minimized.

As shown, the thus-heated strip 11 then passes continuously between pairs of forming rolls as at 12, 13 and 12a, 13a, or equivalent known means for shaping the strip substantially to a tubular form with a longitudinal V-shaped gap 14 extending along the desired weld line. It is important that the gap be maintained with constant dimensions and so that the gap edges in advance of the apex of the gap, that is, in advance of the weld point, will travel along predetermined lines, and whereby the weld point will not tend to shift its position from moment to moment. Otherwise, in heating the gap edges as hereinafter described by the use of high frequency current, successive points on the edges might become differently or irregularly heated. Accordingly it is desirable to insert a suitably supported seam guide as at 14a in the gap and at positions for example shortly following the rolls 12a and 13a. The forming rolls should be carefully positioned as by trial, so that same, in conjunction with this seam guide, will assure the requisite uniform maintenance of the V-shaped gap.

The formed tube is continuously passed along through an induction heating coil. For example, as shown in the drawing, the induction heating coil may comprise a single-turn "coil" 15 surrounding the formed tube in closely-spaced relation thereto and having its terminals as at 16, 17 connected to a suitable source of high frequency current. The frequency of the current used may, for example, be in the neighborhood of 10,000 cycles, but satisfactory results in some cases may be obtained with frequencies of from about 3000 up to 20,000 cycles per second or higher.

It should be appreciated that since the tubing enters and passes through the induction heating coil at a temperature substantially at or higher than its Curie point, the heating effect within the tube metal will be substantially different from that occurring within ferrous metal tubing under like circumstances, but unheated or substantially unheated before it reaches the induction heating coil. That is, since the moment the temperature in the tube metal reaches the Curie point, the ferrous metal will no longer be magnetic, the currents induced therein will be able much more deeply to penetrate and distribute themselves within the metal, with the consequence that the metal offers substantially less effective resistance to the flow thereof, and with greatly diminished heating at regions such as indicated by the dotted lines at 18 where currents are induced which flow in paths circumferentially around the tubing, that is around the "back" of the tubing opposite the gap 14. However, at the edges 19, 20 of the tube metal at regions between the heating coil and the weld point w, because of the V-shaped gap formation, the current will tend to be concentrated closely along such edges in its travel to and from the weld point and at the same time these currents will penetrate to the full depth of the edges and heat same to welding temperature, since the edges at this region are not magnetic. Consequently the heating is largely concentrated along the V-shaped gap edges as desired for bringing same up to maximum temperature, that is, to welding temperature, at the very time they reach the weld point and with very substantially less wasted heating of the tube metal at regions extending around the back of the tubing or at areas spaced from said edges.

After passing the induction coil 15, the strip advances to a pair of squeeze rolls 12b, 13b. As the strip passes between the nip of the squeeze rolls 12b, 13b, the edges 19 and 20 are brought together thereby for welding. It should be pointed out that, in accordance with the invention, particularly if a good so-called "forged" type of weld is to be produced, then the spot on the workpiece which has been brought up to welding temperature, should be pressed into welded condition substantially exactly at the moment when same is at welding temperature. It should not be allowed to fall in temperature before the welding pressure occurs as would be the situation, for example, if attempts should be made to heat the edges of the strip while it is still in flat or only partly curled condition after leaving the furnace, and as would also be the situation if an attempt were made inductively to heat the advancing gap edges by using an inductor means of a type confined to the top or gap portion of the tube. In such a case, one cannot place the coil or inducing member near enough to the weld point without conflicting with the pressure rolls and hence the result would be that the metal at the edges would be brought to a high temperature at the end of the inducing member and yet from there to the weld point, the edges would become cooler. It should be borne in mind that the metal has an upper limit above which it cannot be heated lest it definitely melt down. It is just under such melting point that is most satisfactory for the formation of a forged weld, and if there is any long space between the end of the heating means and the weld point, the temperature falls to a sufficient degree so that the weld will not be satisfactory, and if on the other hand the metal is overheated in advance of the weld point, it will become melted and distorted. It is also important, in accordance with the present invention, that the heating zone not be excessively long or spaced in advance of the weld point, since this would provide more time for oxidation to occur and to permit oxide inclusions in the weld with corresponding weakness. These difficulties are avoided by using an induction heating coil, which encircles or extends circumferentially of the walls of the tube so as to provide a circuit path for the flow of the high frequency current on the tube surface, which path must include the point or spot where welding occurs, thereby affording the so-called "notch effect" where maximum heating occurs and where there is a magnetic "blow out" effect, so-called, causing extraneous material, including oxides, to be ejected, permitting the weld zone to be substantially clean and free of impurities. As the strip passes between the nip of the squeeze rolls 12b, 13b, the edges 19 and 20 are brought together thereby for welding.

In practicing the invention for example by heating the ferrous strip up to the Curie point of about 1330° F. in the furnace, the final induction heating step may be accomplished by using a 50 kilowatt 10,000 cycle per second generator unit connected to a single-turn induction heating coil, as shown, and surrounding, for example, tubing of about one inch in diameter. In cases for example where it may be desired to weld larger tubing, for instance three inches in diameter with walls ¼" thick, this may be accomplished with a 750 kilowatt generator operating at 10,000 cycles per second or higher and with the tubing advanced at the very rapid rate of 300 feet per minute. In this case the strip in the furnace may be desirably heated to a temperature of about 1800° F. so that the whole cross-section of the tube metal will be heated sufficiently to permit ready stretching of the tube down to a desired smaller diameter after same has been welded and passes on through the tube mill.

With the alternative embodiment schematically shown in FIG. 2, the tubing 11' with the V-shaped gap is advanced from the furnace through roller arrangements as in the case of FIG. 1, but here a modified form of induction coil is shown comprising one turn as at 15' formed of a length of fluid-cooled tubing mounted to encircle the work. Here the "coil" at a position just above the V-shaped gap is formed with a "nose" portion as at 25, which will serve to cause the induced flows of heating current along the gap edges to be further concentrated along on the edges and this construction also, if desired, will permit positioning the main part of the coil back further from the weld point in cases where otherwise the coil might conflict with, or come too close to, the rolls 12b, 13b. The "nose" as shown on this coil may be desirable in various circumstances for enhancing the desirable conditions at the weld point above discussed. Also, if desired under certain circumstances, a coil similar to that of FIG. 2 may be arranged to be mounted internally of the tubing very close to the weld point and carried on supporting connections extending rearwardly and up out of the gap.

The invention is particularly advantageous for use in plants which are already equipped for practicing the furnace heating method for welding as hereinabove first mentioned. That is, in such cases the means for blowing air or oxygen onto the tube edges at the region just in advance of the weld point may if desired be dispensed with and replaced by the induction heating coil means as above explained. This will offer the following substantial advantages in most cases:

(1) The possibility of operating the furnace at a temperature range several hundred degrees below that previously used greatly reduces operating and maintenance costs.

(2) The lower furnace temperatures reduce substantially the scale loss.

(3) With the scale formation minimized, the quality of the weld is substantially improved.

(4) Thinner ferrous metal strips may be welded into tubing.

(5) Gas consumption for heating purposes is reduced.

(6) There is less wear of the forming and squeeze rolls due to the absence of scale on the tube metal.

(7) The roll equipment may be operated with less maintenance problems.

(8) The general working conditions in the vicinity of the equipment are improved due to minimizing wasted heating.

(9) The production speed may be substantially increased. In this connection, it will be appreciated that in practicing the furnace method first above referred to, the speed of the operation is limited to the speed at which the furnace can heat the strip to a temperature in the neighborhood of 2200° F.; whereas, in accordance with the present invention, the process can be operated with a lower furnace temperature and therefore at a greater speed in the same furnace.

While the invention has been described above with reference to its use for welding tubing, yet certain aspects of the invention may also be employed for longitudinally welding one edge of a ferrous metal strip portion or the like to the opposed edge of another ferrous strip portion or the like, both of which are first passed through the furnace for heating to about the Curie point and thence passed between rollers of suitable configurations and past induction heating means generally similar to those shown in the drawing.

The equipment may also be adapted for so practicing the method of the invention as to form and weld two or more strips forming the tubing, or elements of other desired cross-sections. U.S. patent to Wogerbauer No. 2,647,981 discloses roller arrangements adaptable for use in such cases.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method of forming tubing of ferrous metal comprising the following combination of steps: heating strip means of such metal in a furnace to bring the same to a temperature at least close to the Curie point thereof or higher, but substantially below welding temperature; continuously forming the thus-heated strip means into an advancing open-seamed tube with edge portions defining an open V-shaped gap and extending opposite one another and longitudinally of the desired tube, the apex of said gap being maintained at the desired weld point; heating such opposed edges to welding temperature while the ferrous strip means is in a condition of being substantially non-magnetic due to being at the temperature of or above the Curie point, such heating being effected by advancing the tube past an induction heating coil positioned circumferentially of the tube walls and energized by high frequency current and located shortly in advance of the weld point, whereby flows of such current are induced and maintained in opposite directions respectively along on the opposed surfaces of said edges, such flows extending from the region of the coil up to and being concentrated at said weld point for heating the metal at said point to welding temperature; and meanwhile pressing together the thus-heated edges at the weld point.

2. Method of welding a longitudinal edge of one ferrous metal portion to an opposed edge of another such portion comprising the following combination of steps: heating such portions in a furnace to bring the same to a temperature at least close to the Curie point thereof or higher, but substantially below welding temperature; continuously advancing the thus-heated portions with said edges defining an open V-shaped gap and extending opposite one another and longitudinally, the apex of said gap being maintained at the desired weld point; heating such opposed edges to welding temperature while the ferrous metal portions are in a condition of being substantially non-magnetic due to being at the temperature of, or above, the Curie point, such heating being effected by advancing the portions past an induction heating coil positioned circumferentially of the metal portions and energized by high frequency current and located shortly in advance of the weld point, whereby flows of such currents are induced and maintained in opposite directions respectively along on the opposed surfaces of said edges, such flows extending from the region of the coil up to and being concentrated at said weld point for heating the metal at said point to welding temperature; and meanwhile pressing together the thus-heated edges at the weld point.

References Cited in the file of this patent

UNITED STATES PATENTS

| | | |
|---|---|---|
| 1,960,523 | Anderson | May 29, 1934 |
| 2,218,570 | Anderson | Oct. 22, 1940 |
| 2,931,885 | Underwood et al. | Apr. 5, 1960 |
| 2,938,993 | Rudd | May 31, 1960 |
| 2,965,740 | McConnell | Dec. 20, 1960 |